United States Patent
Briem

(10) Patent No.: US 6,680,949 B1
(45) Date of Patent: Jan. 20, 2004

(54) METHOD AND CIRCUIT ARRANGEMENT FOR THE TRANSMISSION OF MESSAGE CELLS DURING THE COURSE OF VIRTUAL CONNECTIONS HAVING DIFFERENT PRIORITIES

(75) Inventor: Uwe Briem, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,458

(22) PCT Filed: Feb. 9, 1998

(86) PCT No.: PCT/DE98/00361

§ 371 (c)(1),
(2), (4) Date: Aug. 12, 1999

(87) PCT Pub. No.: WO98/36586

PCT Pub. Date: Aug. 20, 1998

(30) Foreign Application Priority Data

Feb. 14, 1997 (DE) .......................... 197 05 789

(51) Int. Cl.⁷ .................................................. H04Q 3/64
(52) U.S. Cl. ................................ 370/418; 370/395.7
(58) Field of Search ........................... 370/229, 230, 370/232, 235.1, 389, 397, 399, 395.3, 395.42, 395.43, 395.7, 395.71, 395.72, 409, 412, 414, 415, 416, 417, 418, 419

(56) References Cited

U.S. PATENT DOCUMENTS

| | | | | | |
|---|---|---|---|---|---|
| 5,521,916 | A | * | 5/1996 | Choudhury et al. | 370/414 |
| 5,724,358 | A | * | 3/1998 | Headrick et al. | 370/418 |
| 5,793,748 | A | * | 8/1998 | Murase | 370/235 |
| 5,872,769 | A | * | 2/1999 | Caldara et al. | 370/230 |
| 6,058,114 | A | * | 5/2000 | Sethuram et al. | 370/231 |
| 6,295,295 | B1 | * | 9/2001 | Wicklund | 370/392 |

FOREIGN PATENT DOCUMENTS

| | | |
|---|---|---|
| DE | 18 28 862 | 3/1995 |
| EP | 0 526 104 | 2/1993 |
| EP | 0 596 200 | 7/1993 |
| EP | 0 641 099 | 8/1994 |

OTHER PUBLICATIONS

Chao et al. "A New QoS–Guaranteed Cell Discard Strategy: Self–Calibrating Pushout". IEEE Glocal Telecommunications Conference. Nov. 28, 1994–Dec.02, 1994. pp. 929–934.*

Patent Abstracts of Japan, vol. 017, No. 403 (E–1254), Aug. 26, 1992 & JP04–133500A (NEC Tohoku, Ltd.) May 7, 1992.

Qualitatssicherung Null Fehler in Hühnerfutter! Messen, Prüfen, Automatisieren. Nov. 12, 1997, p. 36.

* cited by examiner

*Primary Examiner*—Chi Pham
*Assistant Examiner*—Derrick W Ferris
(74) *Attorney, Agent, or Firm*—Fish & Richardson P.C.

(57) ABSTRACT

Message cells that are allocated to virtual connections having different priorities are transmitted jointly over at least one transmission line of an ATM system working according to an asynchronous transfer mode. While being transmitted via the respective transmission lines, these message cells pass through a buffer memory individually allocated thereto. Given a buffer memory exhibiting a specific filling degree, one or more message cells from message cells of a selected virtual connection of low priority, which are, stored at the moment in the buffer memory, are discarded with the arrival of a message cell on the respective transmission line belonging to a virtual connection of relatively high priority, and dependent on the number of message cells stored for this virtual connection having low priority.

9 Claims, 2 Drawing Sheets

METHOD AND CIRCUIT ARRANGEMENT FOR THE TRANSMISSION OF MESSAGE CELLS DURING THE COURSE OF VIRTUAL CONNECTIONS HAVING DIFFERENT PRIORITIES

BACKGROUND OF THE INVENTION

The present invention is directed to a method and to a circuit arrangement for the transmission joint of message cells, which are allocated to virtual connections having different priorities, via at least one transmission line of an ATM system working according to an asynchronous transfer mode, whereby, during transmission via the respective transmission line, the message cells pass through a buffer memory individually allocated thereto.

In such an ATM system, a number of virtual connections, for which different demands are made with respect to the cell loss probabilities (different priorities), can be simultaneously established on a transmission line. For example, a cell loss probability of $10_{-6}$ can be demanded for one of the virtual connections but no cell loss probability may be demanded for another virtual connection.

European Patent Application No. 0 641 099 discloses a method and an apparatus for the intermediate storage of data. In accord therewith, a data packet stored in a low-priority wait list is erased when an incoming data packet is allocated to a wait list with higher priority and the total length of the wait lists has exceeded a certain length. However, an optimum loading of the wait lists or of the buffer memories forming these is not possible with such a procedure.

European Patent Application No. 0 526 104 likewise discloses a method and an apparatus for the intermediate storage of data packets. A data packet an the lowest-priority wait list is discarded when the total length of the wait lists has exceeded a certain length. The newly added data packet is then written to the empty location in the wait list. However, an optimum loading of the wait lists or of the buffer memories forming these is likewise not possible with such a procedure.

SUMMARY OF THE INVENTION

It is an object of the present invention is to provide a method and a circuit arrangement for efficently loading the transmission lines of an ATM system and the buffer memories respectively allocated to these.

This object is achieved in accordance with the invention in a method of the species initially cited. Message cells are transmitted via a transmission line through a buffer memory individually allocated to the transmission line and having a specific message cell capacity. A message cell belonging to a high-priority virtual connection on the transmission line is received. A wait list allocated to a low-priority virtual connection of message cells stored in the buffer memory is selected upon receiving the message cell belonging to a high-priority virtual connection and upon the buffer memory achieving the specific message cell capacity. The selection depends on the number of message cells being stored in the buffer memory for the low-priority virtual connection. The message cells of said selected wait list are then discarded.

The invention thereby yields the advantage that, viewed overall, fewer connections are damaged on average by cell losses. Above all, in data traffic wherein data packets of a virtual connection are initially segmented before a transmission over the transmission line coming into consideration and the individual segments are subsequently transmitted in a respective message cell, discarding individual message cells is inefficient. In order to avoid data errors, namely, the receiver involved in a virtual connection must discard an entire data package damaged by cell loss. Moreover, the number of data packets transmitted error-free on average, i.e. data packets that suffer no cell loss, is increased.

Over and above this, the present invention avoids a random discard of individual message cells as a result whereof there would be high probability that many virtual connections would be disturbed.

Advantageous developments of the method according to the present invention derive from further embodiments of the invention In further embodiments, all or all except a first of the message cells of a selected low-priority virtual connection are discarded.

In a further embodiment, a virtual connection having a greatest number of message cells is selected.

In a further embodiment, the selection depends on the priorities of the virtual connections and the number of message cells stored for the individual virtual connections.

The advantage is comprised in a further increase in the efficient loading of the transmission lines and the buffer memories allocated to them. What is achieved, for example, by discarding all except the first message cells of the selected low-priority virtual connection the continuity of the connecting paths can be checked adequately in an ATM system.

Over and above this, present invention makes it possible for those virtual connections for which many message cells are being buffered at the moment and that, thus, contribute greater than others to an overload, are preferably utilized for discarding message cells. For example, these are virtual connections that do not adhere to defined connection parameters, for example that exceed the cell rate defined as a maximum for the respective virtual connection.

The above-stated object is achieved in a circuit arrangement operated in accordance with the inventive method. The advantages thereby comprised in what is a low circuit-oriented outlay overall in order to efficiently load the individual transmission lines and the buffer memories allocated to them.

DESCRIPTION OF THE PRESENTLY PREFERRED EMBODIMENT

Figure 1:
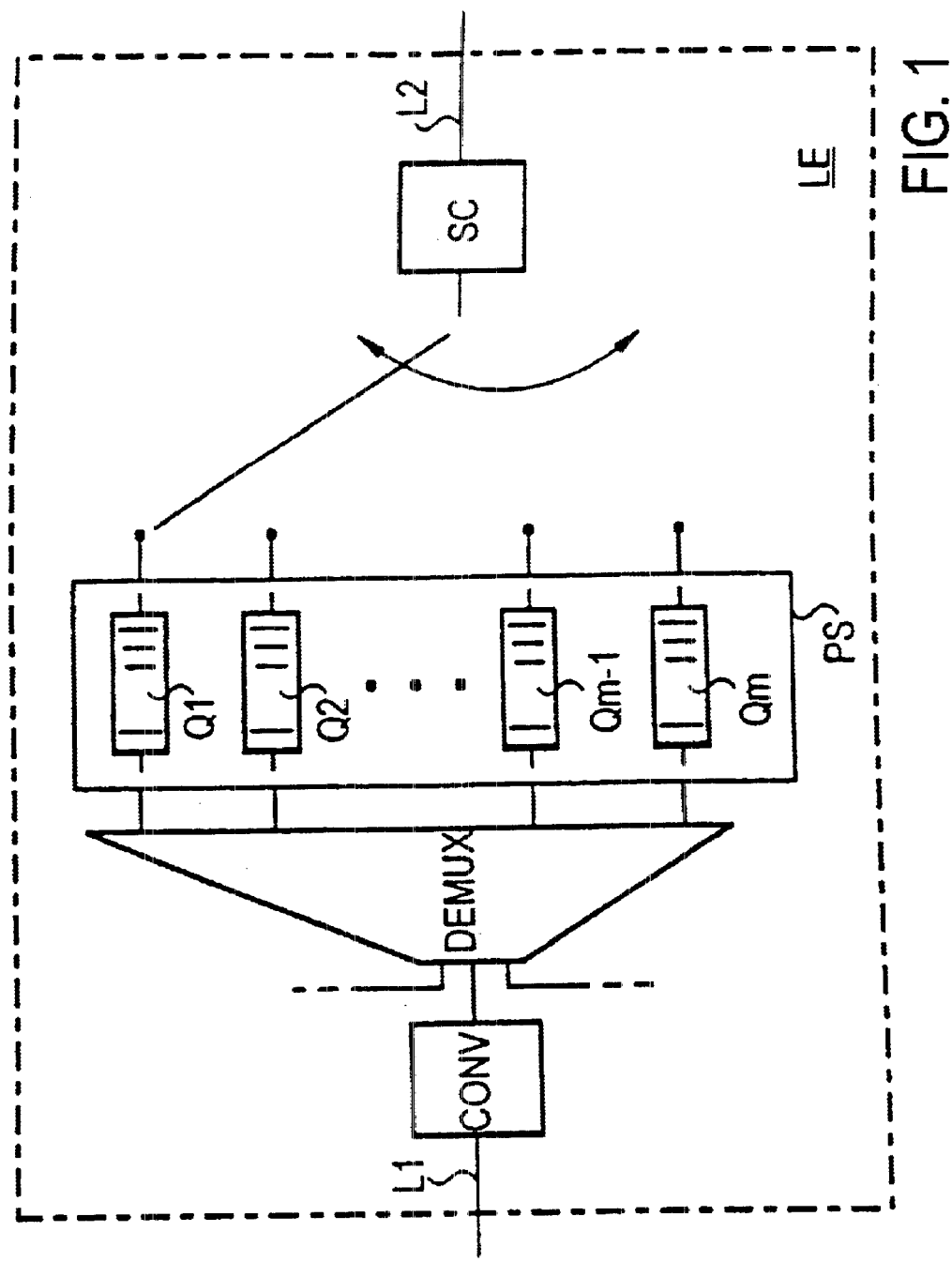
FIG. 1 is a block circuit diagram of a circuit arrangement constructed and operated in accordance with the invention.

FIG. 1 schematically shows line equipment LE that is inserted between two transmission line sections L1 and L2 of an ATM system working according to an asynchronous transfer mode. Only those circuit elements of the line equipment LE that are required for an understanding of the present invention are thereby shown. Over and above this, this line equipment LE stands for further line equipment inserted into transmission line sections of the ATM system.

The general ATM principle is not discussed in detail below, since this is generally known in the art.

Message cells ("cells") occur on the transmission line section L1, these having an external cell header ("header") available to them in a known way in addition to an information part ("user part"). The particulars in such an external cell header thereby include affiliation to a specific virtual connection. A virtual connection can be a matter either of a virtual channel connection (individual connection) or of a virtual path connection (bundle of a number of individual connections). A virtual channel connection thereby has a virtual channel number VCI ("virtual channel identifier") allocated to it but a virtual path connection has a virtual path number VPI ("virtual path identifier") allocated to it in the external cell header of the respective message cell. In a case of a virtual path connection, a virtual channel number VCI is also indicated in the external cell header in order to be able to identify the individual virtual channel connections conducted within the virtual path connection.

The input of the line equipment LE (FIG. 1) is formed by a memory controller CONV. This places an internal cell header ("header") in front of every message cell appearing on the transmission line section L1 in order to be able to forward the respective message cell within the ATM system. This internal cell header is formed according to the criterion of the content of the external cell header respectively contained in the message cells. Among other things, one of m weight list identifiers QID ("Q identifications") is statistically allocated according to the criterion of the VCI or, VPI/VCI contained in the respective external cell header. The respective weight list identifier QID effects an address reduction compared to the allocated VCI or, VPI/VCI and is accepted into the pertaining internal cell header.

The message cells expanded in this way by an internal cell header are successively supplied to a demultiplex means DEMUX (FIG. 1), that is connected via m demultiplex outputs to a buffer memory PS. The demultiplex outputs are individual allocated to the weight list identifiers QID.

The buffer memory PS comprises a number of memory locations from which a maximum m logical weight lists can be formed, as shall be explained in greater detail later. These logical weight lists, which are referenced Q1 through Qm in FIG. 1, are individually selected by the demultiplex means DEMUX with the assistance of the weight list identifiers QID contained in the received message cells. In response to such a selection of a logical weight list, the message cell provided with the weight list identifier QID coming into consideration at the moment is transferred thereinto. The individual logical weight lists Q1–Qm thereby respectively form an FIFO memory ("first-in-first-out" memory) that can simultaneously intermediately store a number of message cells.

At the output side, the logical weight lists (Q1 through Qm) are selected in a defined sequence by an operating means SC ("scheduler") within the framework of a predetermined cell scheduling. In such a read cycle, a message cell is thereby taken from each logical weight list Q1–Qm and forwarded via the transmission line section L2.

The logical weight lists Q1–Qm can exhibit different degrees of filling dependent on the traffic volume on the pertaining transmission line section L1 Given a determined filling capacity of the buffer memory PS (FIG. 1), it is provided according to the present invention that, given the arrival of a message cell that is allocated to a virtual connection (individual connection or path connection) having relatively high priority (high demand made of the cell loss probability), a defined number of message cells of a selected, virtual connection of a lower priority is discarded, i.e. this number of message cells is deleted in the logical weight list Q1–Qm of the buffer memory PS allocated to this virtual connection at the moment. The number can thereby be dependent, for example, on the length of the logical weight list Q1–Qm. Thus, for example, all message cells stored in the pertaining logical weight list Q1–Qm can also be discarded, i.e. deleted.

Alternatively thereto, one can also proceed such that all message cells stored in the pertaining logical weight list Q1–Qm at the moment except the first thereof are discarded. What is thus achieved is that the continuity at the individual connection paths can be checked sufficiently often in the ATM system, which is only partially shown in FIG. 1.

Thresholds for the individual logical weight lists Q1–Qm can be defined for the above-described discarding of message cells, whereby, when a logical weight list Q1–Qm upwardly exceeds such a threshold, the virtual connection allocated thereto is preferably utilized for the discarding.

Given the presence of a number of logical weight lists Q1–Qm, upon consideration of discarding of message cells, the selection can ensue either in a defined sequence or according to a random principle. For example, the priority of the virtual connections allocated to the weight lists Q1–Qm can be utilized as selection criterion for these logical weight lists Q1–Qm. Alternatively or additionally, the momentary length of the individual logical weight lists Q1–Qm can serve as further criterion.

With these last-cited alternatives, it is possible that virtual connections that contribute greater than other virtual connections to an overload are taken into consideration with priority for the discarding of message cells. Examples of these are virtual connections for which the declared connection parameters with respect to the transmission bit rate are not adhered to.

Figure 2:
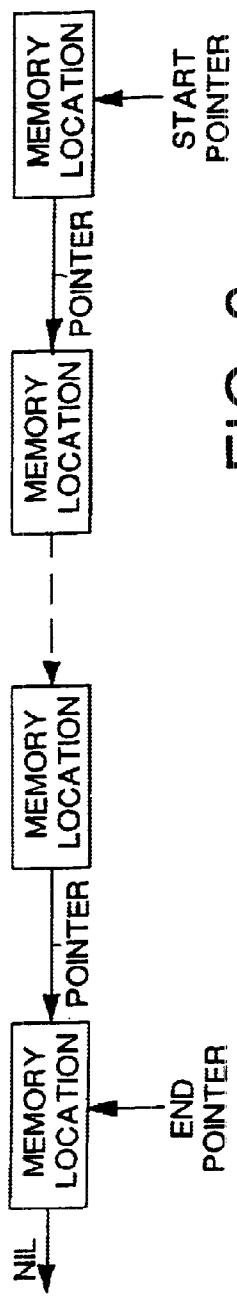
FIG. 2 is a schematic circuit diagram for the formation of a logical weight list.

FIG. 2 schematically shows the formation of one of the logical weight lists Q1–Qm according to FIG. 1. In accord therewith, such a weight list is realized by a simple, chained list of memory locations of the buffer memory PS. Given such a chaining of memory locations, the start and the end of a logical weight list Q1–Qm are marked by a start pointer (address) and an end pointer. Over and above this, an additional pointer (address) that references the following memory location of the weight list Q1–Qm is maintained in each memory location belonging to a weight list Q1–Qm. Only the memory location forming the end of a weight list Q1–Qm comprises no such pointer. This is indicated in FIG. 2 by the reference NIL.

Figure 3:
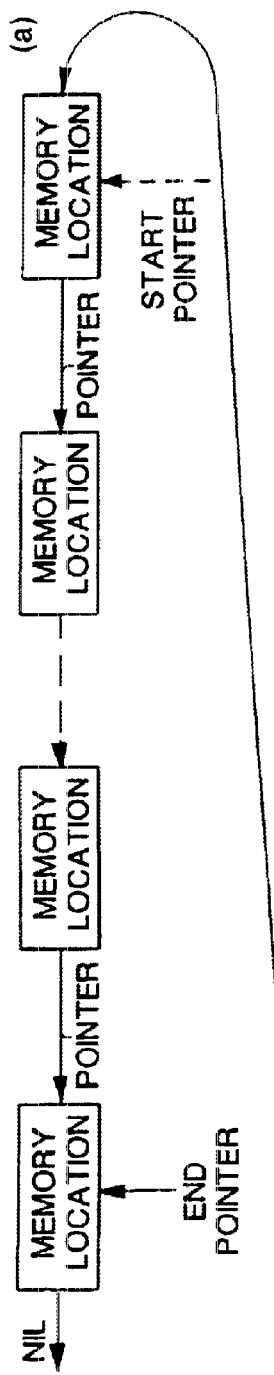
FIG. 3 is a schematic circuit diagram for discarding the cells of a logical weight list.

FIG. 3 schematically shows the discarding of all message cells of a logical weight list Q1–Qm. For this purpose, let the chained list shown under a) represent a logical weight list Q1–Qm to be discarded, whereas b) indicates a free list in which all free memory locations are chained to one another, whereby start and end are again marked by start pointer and an end pointer. For the discarding, a pointer to the first memory location of the logical weight list Q1–Qm to be discarded is then entered in what is the last memory location of the free list at the moment (instead of the previous NIL). The memory location previously forming the end of the logical weight list Q1–Qm to be discarded under a) now represents the end of the free list (indicated with NIL).

In conclusion, let it also be pointed out that the present invention has been explained merely by way of example with reference to a circuit arrangement shown in FIG. 1. Such a circuit arrangement, however, can also be modified in terms of its circuit-oriented realization. Thus, it is possible—as indicated in FIG. 1—that a number of transmission line sections (L1) are simultaneously connected to the demultiplex means DEMUX (FIG. 1) in order to supply the demultiplex means DEMUX with message cells transmitted via these transmission line sections in multiplex mode. Moreover, a number of transmission line sections L2 can be connected via the operating means SC (FIG. 1), the message cells stored in the buffer memory PS being capable of being distributed onto these.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method of transmitting message cells allocated to virtual connections which have different priorities and which are transmitted via at least one transmission line of an asynchronous transfer mode (ATM) system, said method comprising:

passing message cells transmitted via a transmission line through a buffer memory which is allocated to said transmission line and which has a specific message cell capacity;

receiving a message cell for a high-priority virtual connection on said transmission line;

selecting a queue allocated to a low-priority virtual connection of message cells stored in said buffer memory in response to receiving said message cell for the high-priority virtual connection and in response to said buffer memory reaching said specific message cell capacity, wherein selection of the queue is based on a number of message cells stored in said buffer memory for said low-priority virtual connection; and discarding message cells in said queue.

2. The method according to claim 1, wherein discarding comprises discarding all message cells in the queue that are in said buffer memory.

3. The method according to claim 1, wherein discarding comprises discarding all message cells in the queue that are stored in said buffer memory except for a first of the message cells in the buffer memory.

4. The method according to claim 1, wherein selecting is performed for a virtual connection having a number of message cells stored in said buffer memory.

5. The method according to claim 1, wherein selecting is performed for a virtual connection having a greatest number of message cells stored in said buffer memory.

6. The method according to claim 1, wherein selecting is based on priorities of said virtual connections and a number of message cells stored for individual virtual connections.

7. Circuitry for transmitting message cells that are allocated to virtual connections and that have different priorities via at least one transmission line of an asynchronous transfer mode (ATM) system, the circuitry comprising:

a buffer memory having a specific message cell capacity, the message cells passing through the buffer memory during transmission;

a memory controller that allocates the buffer memory to a transmission line and that allocates logical queues to virtual connections on said transmission line;

wherein the memory controller selects a logical queue allocated to a low-priority virtual connection in response to arrival of a message cell of a high-priority virtual connection on said transmission line and in response to said buffer memory reaching said specific message cell capacity, the memory controller selecting the logical queue based on a number of message cells stored in said buffer memory for the low-priority virtual connection, and wherein said message cells allocated to said selected logical queue are discarded.

8. The circuitry according to claim 7, wherein said memory controller discards all message cells indicated in a selected logical queue.

9. The circuitry according to claim 7, wherein said memory controller discards message cells indicated in a selected logical queue except a first of the message cells.

* * * * *